United States Patent [19]

Pollak-Banda et al.

[11] 4,369,668
[45] Jan. 25, 1983

[54] AXIAL THRUST COMPENSATION SYSTEM

[75] Inventors: Erich Pollak-Banda; Erich John, both of Augsburg, Fed. Rep. of Germany

[73] Assignee: Zahnraderfabrik Renk A.G., Augsburg, Fed. Rep. of Germany

[21] Appl. No.: 157,441

[22] Filed: Jun. 9, 1980

[30] Foreign Application Priority Data

Jun. 16, 1979 [DE] Fed. Rep. of Germany ....... 2924349

[51] Int. Cl.³ .......................... F16H 1/08; F16H 1/20
[52] U.S. Cl. ........................................ 74/414; 74/410; 74/431; 74/466
[58] Field of Search ................. 74/413, 410, 432, 433, 74/431, 466

[56] References Cited

U.S. PATENT DOCUMENTS

| | | | |
|---|---|---|---|
| 1,306,157 | 6/1919 | Smith | 74/410 |
| 1,385,987 | 8/1921 | Eaton | 74/410 |
| 1,989,663 | 2/1935 | Bethune | 74/466 |
| 2,982,146 | 5/1961 | Stoeckicht | 74/410 X |
| 4,187,735 | 2/1980 | Terry | 74/410 |

FOREIGN PATENT DOCUMENTS

| | | |
|---|---|---|
| 401652 | 9/1924 | Fed. Rep. of Germany . |
| 1188890 | 3/1965 | Fed. Rep. of Germany . |
| 1215463 | 4/1966 | Fed. Rep. of Germany . |
| 271122 | 5/1969 | Fed. Rep. of Germany . |
| 2363968 | 10/1975 | Fed. Rep. of Germany . |
| 417813 | 11/1910 | France . |
| 879556 | 11/1962 | France . |

OTHER PUBLICATIONS

"Zahnräder", by Dudley/Winter, 1961, p. 539.

Primary Examiner—Rodney H. Bonck
Attorney, Agent, or Firm—Natter & Natter

[57] ABSTRACT

An axial thrust compensation system in high speed helical gear engagement includes a thrust collar fixed to a shaft which carries a gear. The collar includes a peripheral groove. Another gear carrying shaft includes a disc element which engages the thrust collar groove. Axial thrust generated in the respective gears and the shafts due to the driving engagement between the gears will be transferred between the shafts by the collar and disc. In one embodiment, the collar and/or disc is formed in one piece with its shaft, while in another embodiment the collar and/or disc is bolted to its shaft. A further embodiment provides a pair of disc shaped collars spaced from opposite sides of one gear with the collars framing a pair of disc elements fixed to the other shaft.

11 Claims, 5 Drawing Figures

AXIAL THRUST COMPENSATION SYSTEM

BACKGROUND OF THE INVENTION

1. Field of the Invention

The present invention relates generally to gear transmissions and more particularly to mechanisms for compensating axial thrust forces between gears in a high speed environment.

2. Brief Description of the Prior Art

In gear trains which employed helical gears, axial thrust was generated on the respective gear shafts due to the driving engagement between the gears. The direction of axial thrust generated in the respective gear shafts was dependent upon the directions of rotation of the respective shafts as well as the driving or driven function which the respective shafts assumed. In relatively low speed gearings, axial thrust bearings have been employed to compensate for the axial thrusts which have been generated.

In high speed gearings, however, thrust collars have been employed to absorb and compensate axial thrust forces. The employment of thrust collars was required at high tooth speeds (approximately 130 meters per minute or greater) in lieu of axial thrust bearings because thrust bearings generated excessive heat at such speeds.

A typical installation suitable for the employment of thrust collars has been gearing systems for high speed compressor installations where, for example, tooth speeds in the order of 178 meters per minute at 13,400 revolutions per minute were encountered. In such systems, the transmitted power was in the order of 17 megawatts (approximately 20,000 horsepower).

In construction, the helical gears were normally formed in one piece with their respective shafts and a pair of annular thrust collars were force fitted on one shaft against opposite sides of the gear. Journal bearings were located on opposite sides of the shaft with the thrust collars between the bearings and the gear. The thrust collars were of a diameter greater than that of the gear on its shaft and served to frame the meshing gear to thereby prevent axial movement between the respective gears.

This prior thrust collar design was subject to certain disadvantages. At the high rotational speeds, centrifugal force counteracted the force fit engagement between the thrust collars and their shaft. Thus, the thrust collars were unable to absorb the axial thrusts generated in the system. A typical speed at which the force fit engagement between the thrust collars and their shaft has broken down due to centrifugal forces generated has been at a pitch speed in the order of approximately 150 meters per second.

One approach toward overcoming this problem has been to reduce the circumferential speeds by reducing the diameters of the respective gears and their shafts. This, however, resulted in the requirement of increasing the width of the respective gears in order to maintain the requisite strength required for power transmission. Unfortunately, a result of this approach has been that, when the gears were widened, excessive flexure and twist were encountered as a result of the increased space between the shaft supports. The increased flexure and torque were accentuated due to the fact that the thrust collars were positioned between the gear and the journal bearings.

Attempts at resolving this problem by compensating for the excessive torque with a modified tooth angle only compounded the situation. This was because, when the gear train operated under a partial load, the modified tooth angle resulted in a unilateral tooth load.

Among the further disadvantages of the prior thrust collar assemblies was that they were often difficult to install on driving shafts due to the flanges which were normally forged on the driven shaft.

A further problem which has been encountered with the use of prior thrust collar assemblies has been that the thrust collars have hindered oil and heat transfer between the teeth of the respective gears. This was partially due to the fact that the collars provided a peripheral lip about one of the gears and framed the teeth of the other gear.

SUMMARY OF THE INVENTION

The invention comprises an axial thrust compensation system adapted for use in conjunction with a high speed helical gear assembly. The thrust compensation system provides for transfer and absorption of axial thrust generated between two helical gears in engagement with each other. Each gear is carried on a shaft. An annular thrust collar having a peripheral groove is fixed to one of the shafts spaced from rather than abutting a side of the gear carried on the shaft. The other shaft carries a disc element which is received in the groove of the thrust collar. The engagement between the thrust collar and the disc element prevents axial movement between the respective shafts and gears.

In a first embodiment, a journal bearing is positioned adjacent opposite sides of each gear. The collar and/or disc element is formed in one piece with its shaft and positioned adjacent a journal bearing.

In a further embodiment the collar and/or disc element is bolted to its shaft. In another embodiment a pair of disc shaped thrust collars are employed, one positioned adjacent each of the journal bearings. The two thrust collars receive a pair of disc elements fixed to the other shaft adjacent the journal bearings to which the other shaft is mounted.

From the foregoing compendium, it will be appreciated that it is an object of the present invention to provide an axial thrust compensation system of the general character described which is not subject to the disadvantages of the prior art as aforementioned.

A further object of the present invention is to provide an axial thrust compensation system of the general character described which is well suited to counteract axial thrust generated in a high speed, high power, helical gear engagement in a simple and efficient manner.

Another object of the present invention is to provide an axial thrust compensation system of the general character described which facilitates lubricant transfer between engaging gears.

Yet a further object of the present invention is to provide an axial thrust compensation system of the general character described which does not impede heat transfer between engaging gears.

A further object of the present invention is to provide an axial thrust compensation system of the general character described which provides reduced gear shaft span between journal bearings.

A further object of the present invention is to provide an axial thrust compensation system of the general character described which provides increased efficiency at high gear speeds.

A further object of the present invention is to provide an axial thrust compensation system of the general character described which includes a thrust collar fixed to a gear shaft wherein the collar is not subject to axial movement as a result of centrifugal forces.

Other objects of the present invention in part will be obvious and in part will be pointed out hereinafter.

With these ends in view, the invention finds embodiment in certain combinations of elements and arrangements of parts by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the possible exemplary embodiments of the invention.

DETAILED DESCRIPTION OF THE INVENTION

Figure 1:
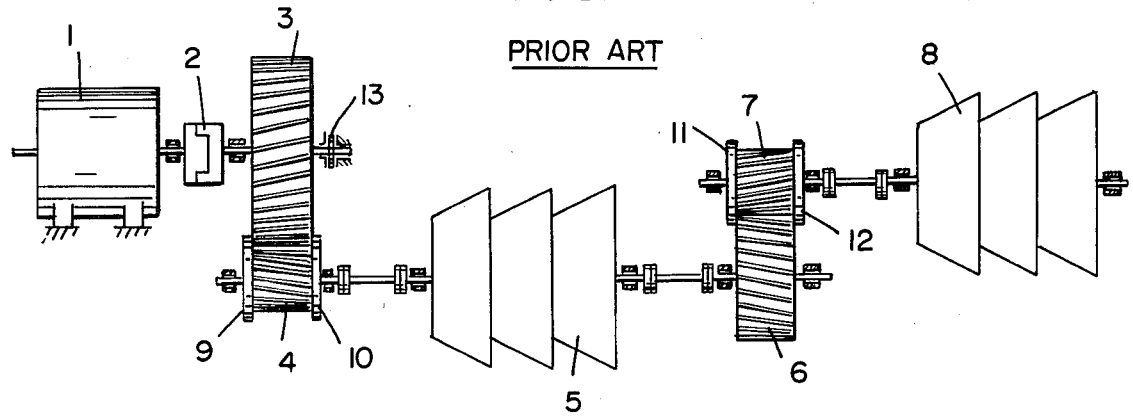
FIG. 1 is a schematized diagramatic representation of a prior art thrust compressor system with high speed helical gearing and illustrating a prior thrust collar assembly for the purpose of demonstrating a typical environment in which the axial thrust compensation system of the present invention may be employed.

Referring first to the known implementation of thrust collars as exemplified by a thrust compressor system shown in FIG. 1, the reference numeral 1 denotes a motor which is employed for driving a thrust compressor system. A motor output of 26 megawatts would be typical in such implementations. The output shaft of the motor 1 is selectively coupled to a helical spur gear 3 through a clutch assembly 2. The helical spur gear 3 is in driving engagement with a further helical spur gear 4. The shaft of the gear 4 is connected to and drives a low pressure compressor 5 and a further helical spur gear 6.

The spur gear 6 in turn drives a spur gear 7 which is employed to drive a high pressure compressor 8. The prior art thrust collar assembly as shown in FIG. 1 includes a pair of disc shaped thrust collars 9, 10 force fitted on the shaft of the spur gear 4 in abutment with the sides of the gear 4. A similar thrust collar assembly is provided between gears 6 and 7 and includes a pair of disc shaped thrust collars 11, 12 force fitted on the shaft of the spur gear 7 in abutment with the side walls of the spur gear 7.

The thrust collars 9, 10 of the spur gear 4 are of a diameter greater than that of the gear 4 and serve to frame the teeth of the driving gear 3 to prevent axial movement of the gears 3, 4 or their shafts with respect to one another. Similarly, the thrust collars 11, 12 are of a diameter greater than that of the spur gear 7 and frame the teeth of the driving spur gear 6. The thrust collar assemblies 9, 10 and 11, 12 transmit axial forces between the respective driving and driven gears and their shafts.

The resultant axial force of the entire system is absorbed by an axial thrust bearing 13 which supports the shaft of the gear 3. It should be appreciated that the gear 3 shaft operates at a relatively low speed of rotation, corresponding to that of the motor output shaft, e.g. 1200 RPM. The shaft of the spur gear 4 which is driven by the spur gear 3 is at a higher rate, for example 7200 RPM. The speed of the spur gear 7 and its shaft which drives the high speed compressor 8 is approximately 13,400 RPM as a result of the driving engagement between the spur gears 6 and 7. It should be appreciated that the axial thrust bearing 13 which was the only thrust bearing in the system was employed on the shaft of lowest rotational speed.

Figure 2:
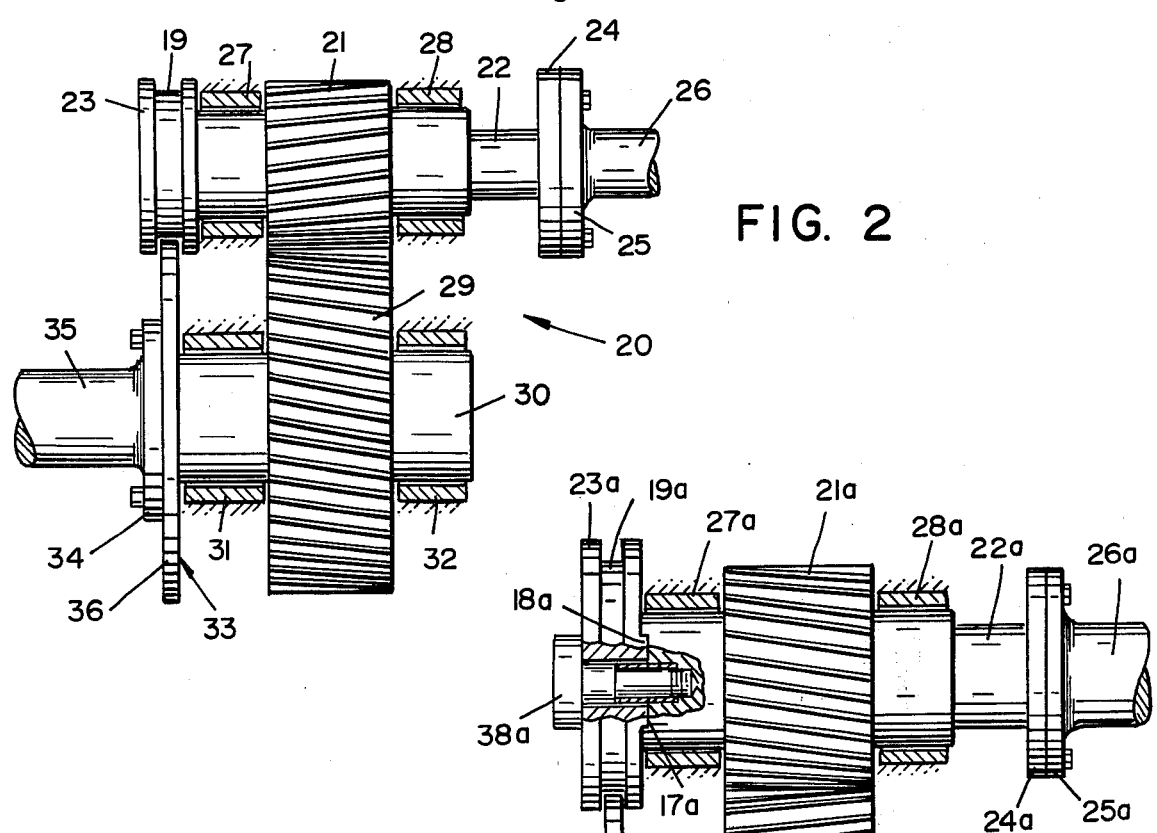
FIG. 2 is an enlarged scale schematized representation of an axial thrust compensation system constructed in accordance with and embodying the present invention and showing a grooved thrust collar on one gear shaft in engagement with a disc element fixed to another gear shaft.

In FIG. 2 an axial thrust compensation system 20 constructed in accordance with and embodying the present invention is illustrated. A helical spur gear 21 is formed in one piece with a shaft 22, and a thrust collar 23 is forged on an end of the shaft 22. The thrust collar 23 includes an annular peripheral groove 19. The opposite end of the shaft 22 includes a connection flange 24 which joins the shaft 22 to an output shaft 26 through an output shaft flange 25. The shaft 22 is supported by a pair of journal bearings 27, 28 positioned adjacent opposite sides of the spur gear 21 with the journal bearing 27 positioned between the thrust collar 23 and the spur gear 21.

A driving helical spur gear 29 is in meshing engagement with the gear 21 and is formed in one piece with a shaft 30. The shaft 30 is supported on opposite sides of the spur gear 29 by a pair of journal bearings 31, 32.

A flange 33 is forged to the shaft 30 with the journal bearing 31 being positioned between the flange 33 and the spur gear 29. The flange 33 serves to interconnect the shaft 30 with an input or drive shaft 35 through a drive shaft flange 34.

In accordance with the present invention, the flange 33 is of enlarged or extended diameter and forms a disc element 36 in registration with and engaging the groove 19 of the thrust collar 23. It should be appreciated that, with the disc element 36 constrained by the side walls of the thrust collar 23 and within the groove 19, a double action thrust compensation system is provided, that is axial thrust in either of two directions will be compensated so that the shafts 22, 30 as well as their respective gears 21, 29 will not be displaced axially with respect to one another. In a transmission system or multiple gear train, the resultant axial thrust would be accommodated by a thrust bearing at the low speed shaft.

Figure 3:
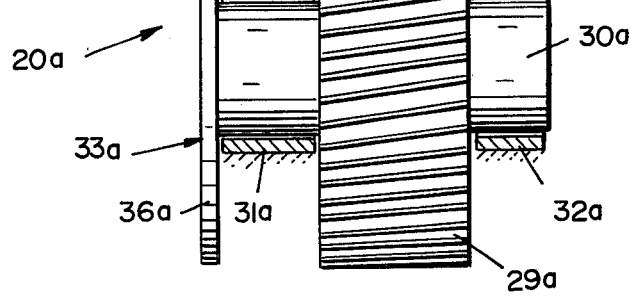
FIG. 3 is a similar schematized representation of an axial thrust compensation system constructed in accordance with an alternate embodiment of the present invention wherein the thrust collar is fixed to its shaft by a threaded bolt.

In FIG. 3 an alternate embodiment of the present invention is illustrated. In this embodiment, like numerals denote like components previously described with reference to the prior embodiment, however bearing the suffix "a". This embodiment differs from the prior embodiment previously disclosed in that, in lieu of forging the thrust collar in one piece construction with its shaft, an alternate means of axial securement is employed. A shaft 22a which includes a helical spur gear 21a is coupled to a power output shaft 26a in a manner previously described with reference to the prior embodiment. The helical spur gear 21a is driven by a helical spur gear 29a which is formed in one piece construction with a shaft 30a. The shaft 30a is driven in a manner identical to that of the shaft 30.

A thrust collar 23a is similar to the thrust collar 23 previously described but of modified construction. The collar 23a includes a hub 18a which projects from a side wall and extends into a mating concentric recess 17a formed in an end of the shaft 22a. The thrust collar 23a is held fast to the shaft 22a by a bolt 38a which is threadingly received in the shaft 22a. As with the previous embodiment, a disc element 36a is received within a groove 19a of the thrust collar and the gears 21a and 29a, as well as their shafts 22a, 30a, are restrained from being displaced axially with respect to one another.

Thus, an alternate construction is provided for joining a thrust collar to a shaft which, like the construction of the first embodiment, is not subject to reduced efficiency at high speed.

Figure 4:
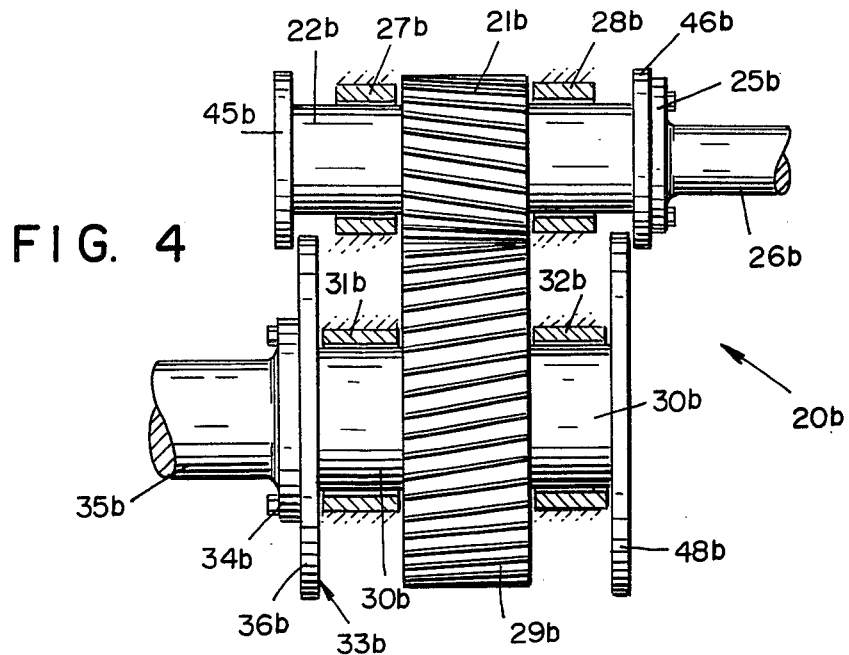
FIG. 4 is a further schematized representation of an axial thrust compensation system constructed in accordance with a different embodiment of the invention wherein a pair of disc shaped thrust collars are positioned on one gear shaft and a pair of disc shaped elements are fixed to the other shaft with the elements being framed by the collars.

Another embodiment of the invention is illustrated in FIG. 4. In this embodiment, like numerals denote like components described with reference to the prior embodiments, however bearing the suffix "b". In the embodiment, a pair of disc shaped thrust collars 45b, 46b are constructed in one piece with a shaft 22b which carries a helical spur gear 21b. The shaft 22b is supported by a pair of journal bearings 27b, 28b positioned adjacent the sides of the gear 21b in a manner identical to that of the prior embodiments. The disc thrust collars 45b, 46b are forged with the shaft 22b on opposite sides of the gear 21b with the journal bearings 27b, 28b positioned between the thrust collars 45b, 46b and the gear 21b.

A drive shaft 35b engages a gear shaft 30b to drive a helical spur gear 29b in a manner identical to that of the embodiment of FIG. 2. Furthermore, the shaft 30b includes a forged flange 33b having a disc element 36b projecting therefrom. On the opposite side of the pinion 29b, a further disc element 48b is forged with the shaft 30b.

The diameter of the disc elements 36b, 48b are such that the disc elements are spaced from the shaft 22b a distance less than the distance the thrust collars 45b, 46b project from the shaft 22b. Because the spacing between the thrust collars 45b, 46b is greater than the spacing between the distal sides of the disc 36b, 48b, the disc elements 36b, 48b are restrained between the thrust collars. Axial thrust will be compensated by the cooperation between the thrust collars and the disc elements. The cooperation between the disc element 36b and the thrust collar 45b is unilateral in that the engagement compensates for axial thrust toward the left with respect to the shaft 30b and toward the right with respect to the shaft 22b, while axial thrust in opposite directions is compensated by the engagement between the thrust collar 46b and the disc 48b.

Figure 5:
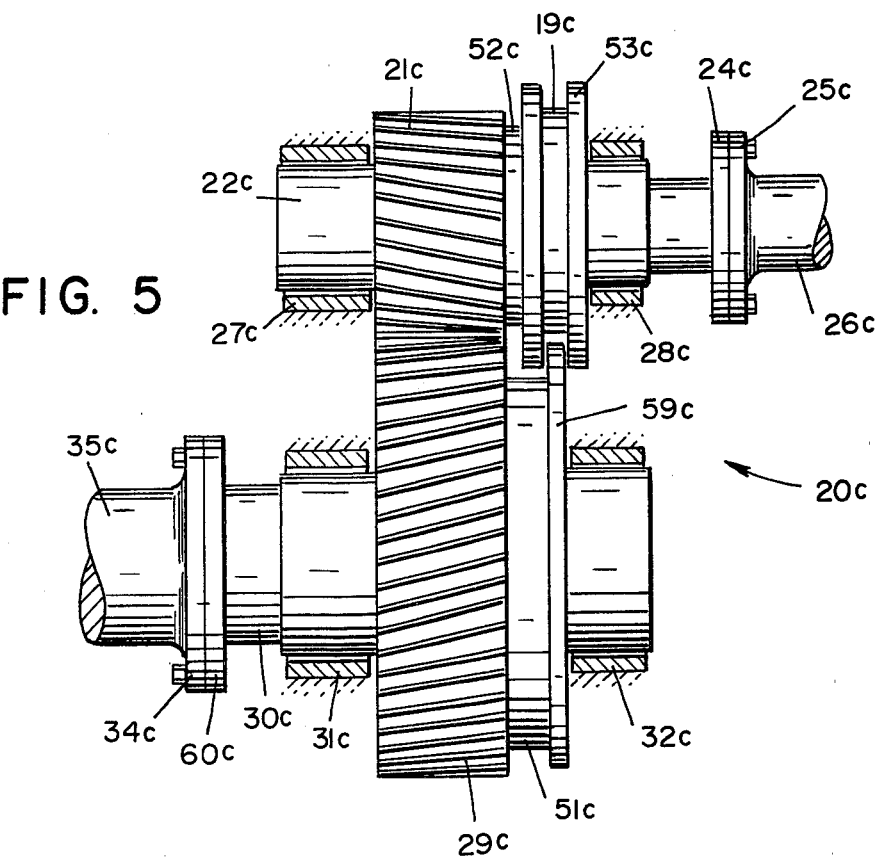
FIG. 5 is a similar view of a still further embodiment of the present invention wherein the thrust collar is positioned on its shaft between the gear and a journal bearing.

A further embodiment of the present invention is disclosed in FIG. 5 wherein like numerals denote like components of the embodiments previously described, however bearing the suffix "c". In this embodiment, a helical spur gear 21c is in one piece construction with a shaft 22c. A thrust collar 53c is forged to the shaft 22c. The collar 53c includes a peripheral groove 19c similar to the groove formed in the thrust collars of the embodiments of FIGS. 2 and 3. The thrust collar 53c is positioned adjacent one side of the spur gear 21c and spaced axially from the side of the gear 21c by a hub 52c of reduced diameter. This embodiment differs from the prior embodiments in that the thrust collar 53c is positioned between a journal bearing 28c and a side of the spur gear 21c, whereas in the prior embodiments the journal bearings were positioned between the thrust collar and the spur gear.

The spur gear 21c is driven by a helical spur gear 29c formed in one piece construction with a shaft 30c which is in turn engaged by a drive shaft 35c through a flange coupling 34c, 60c. A disc shaped axial thrust element 59c is forged to the shaft 30c and positioned adjacent a side of the gear 29c in registration with the groove 19c of the thrust collar 53c. The disc element 59c is spaced from the side of the spur gear 29c by a hub 51c.

The shaft 30c is supported by a pair of journal bearings 31c, 32c with the disc element 59c positioned between the bearing 32c and the spur gear 29c. The physical engagement between the disc element 59c and the thrust collar 53c is identical to that described with reference to the prior embodiments and accommodates axial thrust in either direction.

It should also be noted that, although the spacing between the journal bearings 27c, 28c on the shaft 22c and the bearings 31c, 32c on the shaft 30c is somewhat greater than the spacing between the journal bearings in the embodiments of FIGS. 2 through 4, such spacing is less than that in the prior known designs wherein journal bearings were separated from each other a distance suitable for accommodating the gear and two thrust collars as shown in FIG. 1.

It should be appreciated that, since the thrust collars and disc elements of the present invention are either forged in one piece construction with their respective shafts or otherwise secured such as by being bolted, centrifugal forces generated at high rotational speeds will not provide an adverse effect to the axial thrust compensation characteristics of the system.

Furthermore, the adverse effects of centrifugal force of prior thrust collar implementations can also be reduced pursuant to the present invention by providing a reduced diameter area on the gear shaft in a zone beyond the journal bearings and force fitting a thrust collar and/or disc element constructed in accordance with the present invention upon such reduced diameter zone. In such instance, the radial force counteracting the force fit will not be as great as that encountered in the prior art at the same rotational speed.

It should be understood that the position of the thrust collars and disc elements with respect to the function of their shafts described herein is merely exemplary and that thrust collars may be fixed to the driving shafts with the cooperating disc elements fixed to the driven shaft.

Furthermore, although the axial thrust compensation system of this invention has been described with reference to axial thrusts generated by mutually engaged helical gears, the present invention is well suited to any gearing environment wherein axial thrust is encountered.

The term "forged" as emplyed herein refers to a one piece unitary construction with the associated spur gear, thrust collar, disc element and shaft which may be produced by various fabrication techniques including, but not limited to, forging. Furthermore, the term "journal bearing" as used herein refers to any type bearing employed for the purpose of supporting a rotating shaft and not specifically designed to contain axial thrust forces.

Thus, it will be seen that there is provided an axial thrust compensation system which achieves the various objects of the present invention and which is well adapted to meet the conditions of practical use.

As various changes might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. In a gearing assembly comprising two gears in engagement, a pair of gear shafts, each gear being secured to a shaft, the improvement comprising an axial thrust compensation system, the system including disc means projecting from one of the shafts, the disc means being fixed to the one shaft against axial displacement, the other shaft including thrust collar means for accommodatingly receiving the disc means, threaded securement means coaxial with the other shaft for fixing the thrust collar means to the other shaft against axial displacement, a side surface of the disc means engaging the thrust collar means for transfer of forces in an axial direction therebetween and for restraining axial displacement of the disc means relative to the thrust collar means, the periphery of the disc means being free of engagement with the thrust collar means, the gearing assembly further including a pair of journal bearings associated with each shaft, a zone of each shaft on opposite sides of its respective gear being received within a journal bearing, one journal bearing being positioned between the disc means and the gear secured to the one shaft and another journal bearing being positioned between the thrust collar means and the gear secured to the other shaft, whereby high speed gear engagement may be maintained and axial thrust compensated while shaft flexure is minimized.

2. An axial thrust compensation system constructed in accordance with claim 1 wherein one of the gears and its shaft are formed of one piece unitary construction.

3. An axial thrust compensation system constructed in accordance with claim 2 wherein each gear and its respective shaft are formed of one piece unitary construction.

4. An axial thrust compensation system constructed in accordance with claim 1 wherein the disc means and the one shaft are formed of one piece unitary construction.

5. An axial thrust compensation system constructed in accordance with claim 4 wherein the gear secured to the one shaft is formed of one piece unitary construction with the one shaft.

6. In a gearing assembly comprising two gears in engagement, a pair of gear shafts, each gear being secured to a shaft, the improvement comprising an axial thrust compensation system, the system including disc means projecting from one of the shafts, the disc means being fixed to the one shaft against axial displacement, the other shaft including a pair of thrust collar means for accommodatingly receiving the disc means, the disc means being received between the pair of thrust collar means, a side surface of the disc means engaging one of the thrust collar means for the transfer of forces in an axial direction therebetween and for restraining axial displacement of the disc means relative to the one thrust collar means, the periphery of the disc means being free of engagement with the pair of thrust collar means, the pair of thrust collar means being fixed to the other shaft against axial displacement, the gearing assembly further including a pair of journal bearings associated with each shaft, a zone of each shaft on opposite sides of its respective gear being received within a journal bearing, one journal bearing being positioned between the disc means and the gear secured to the one shaft and the journal bearings associated with the other shaft each being positioned between the other shaft gear and a thrust collar means.

7. An axial thrust compensation system constructed in accordance with claim 6 further including a pair of disc means, each journal bearing associated with the one shaft being positioned between the one shaft gear and a disc means.

8. An axial thrust compensation system constructed in accordance with claim 6 wherein one of the gears and its shaft are formed of one piece unitary construction.

9. An axial thrust compensation system constructed in accordance with claim 8 wherein each gear and its respective shaft are formed of one piece unitary construction.

10. An axial thrust compensation system constructed in accordance with claim 6 wherein the disc means and the one shaft are formed of one piece unitary construction.

11. An axial thrust compensation system constructed in accordance with claim 6 wherein the pair of thrust collar means and the other shaft are formed of one piece unitary construction.

* * * * *